Figure 1:
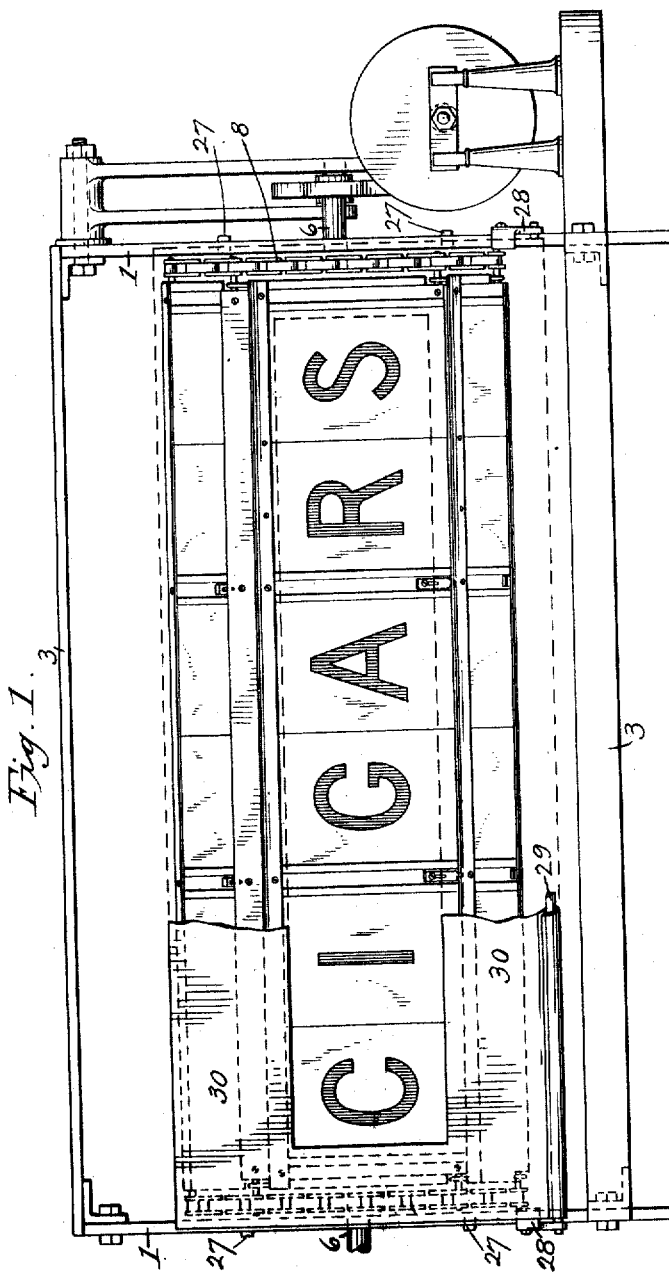

No. 821,068. PATENTED MAY 22, 1906.
T. W. THOMAS & G. W. GILLETTE.
AUTOMATIC CHANGEABLE SIGN.
APPLICATION FILED MAY 18, 1905.

6 SHEETS—SHEET 1.

Witnesses:
A. L. Lord
E. G. Kermode

Inventors
Thomas W. Thomas
George W. Gillette
by Kramer Chapman
Attorneys

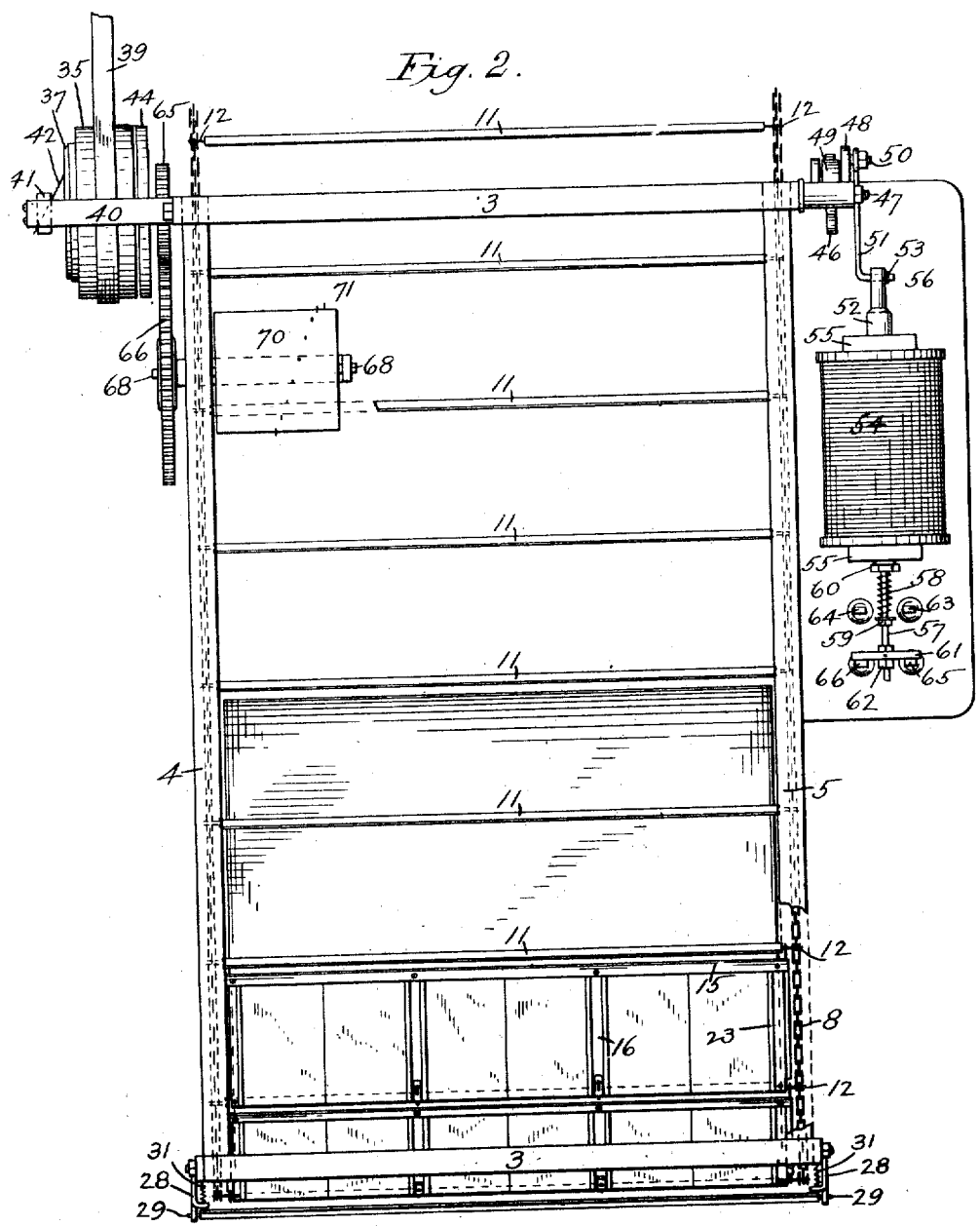

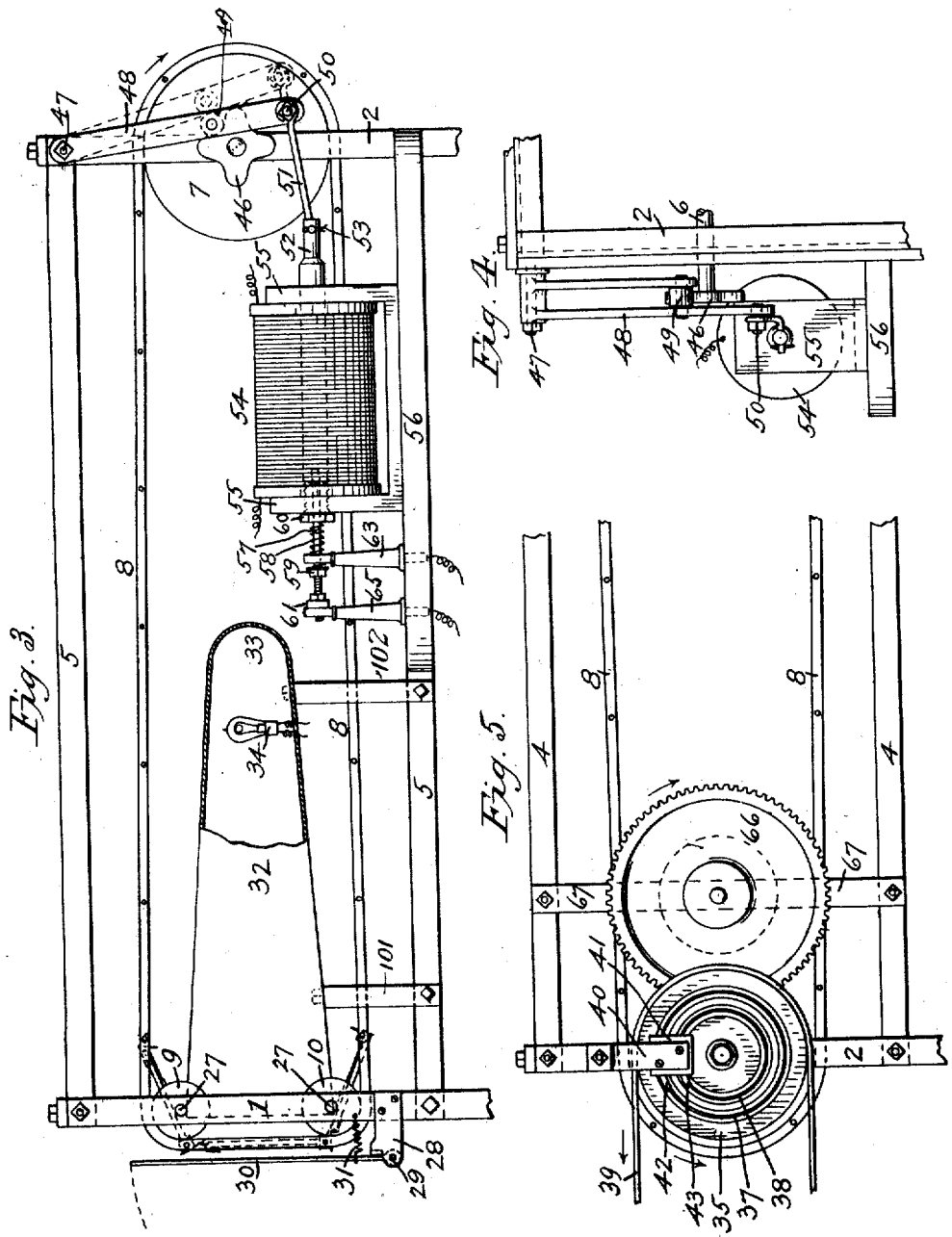

No. 821,068. PATENTED MAY 22, 1906.
T. W. THOMAS & G. W. GILLETTE.
AUTOMATIC CHANGEABLE SIGN.
APPLICATION FILED MAY 18, 1905.
6 SHEETS—SHEET 4.
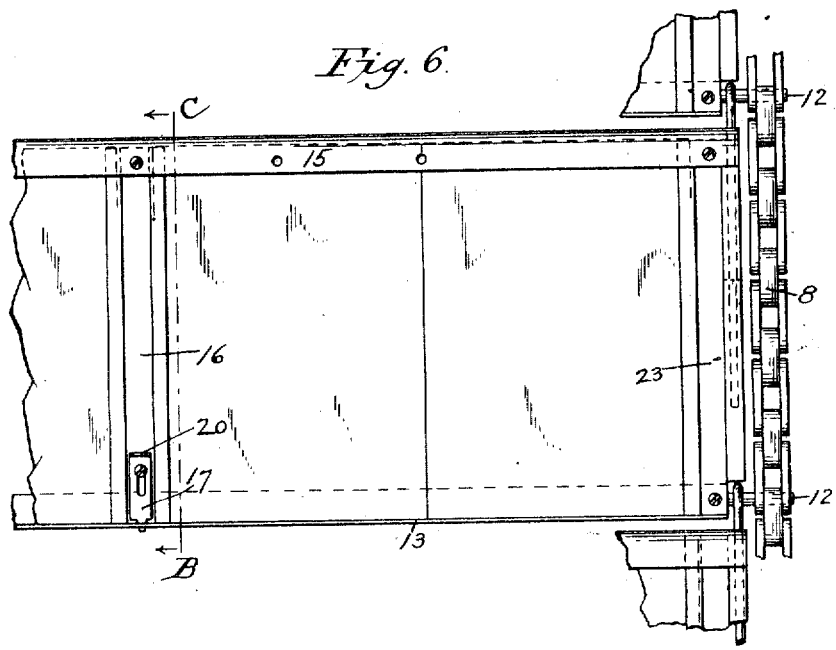
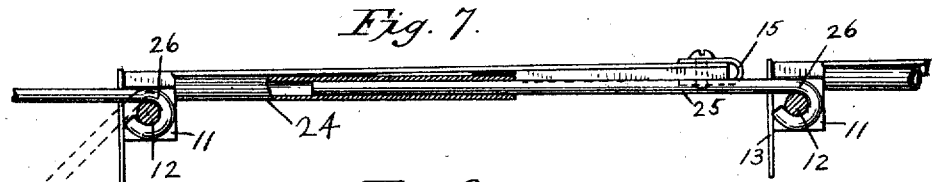
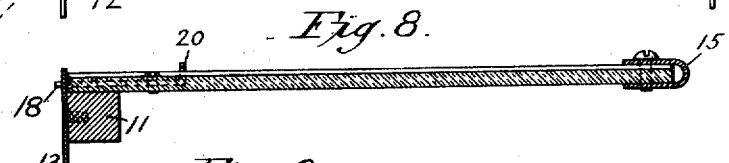
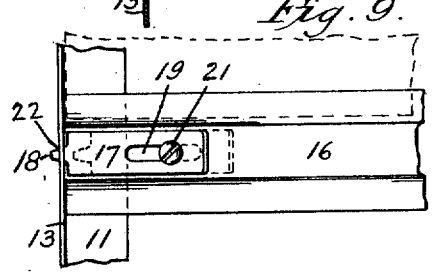
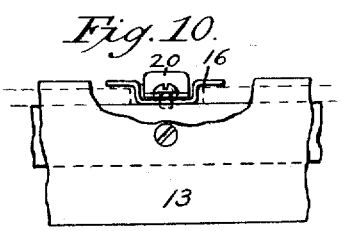
Witnesses:
A. L. Lord
E. G. Kenwood
Inventors
Thomas W. Thomas
George W. Gillette
by Kramer Chapman
Attorneys

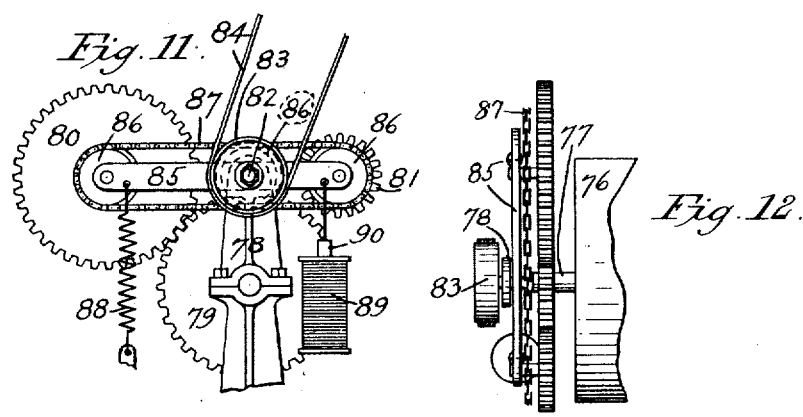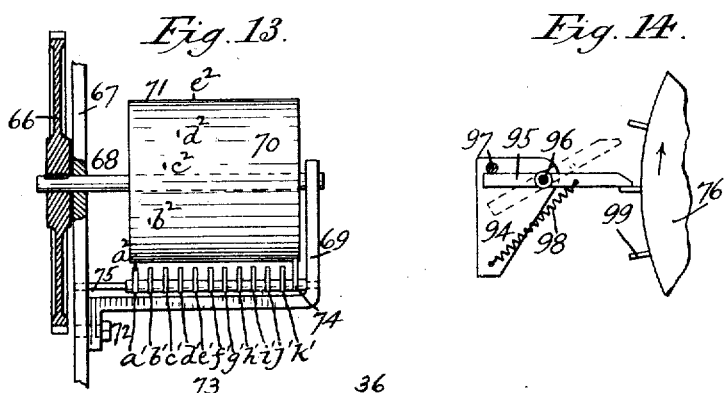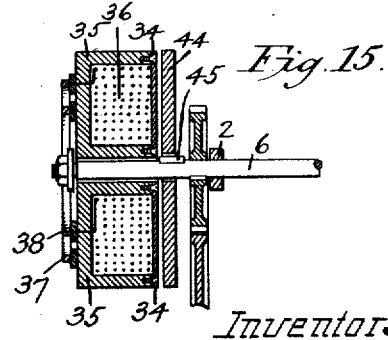

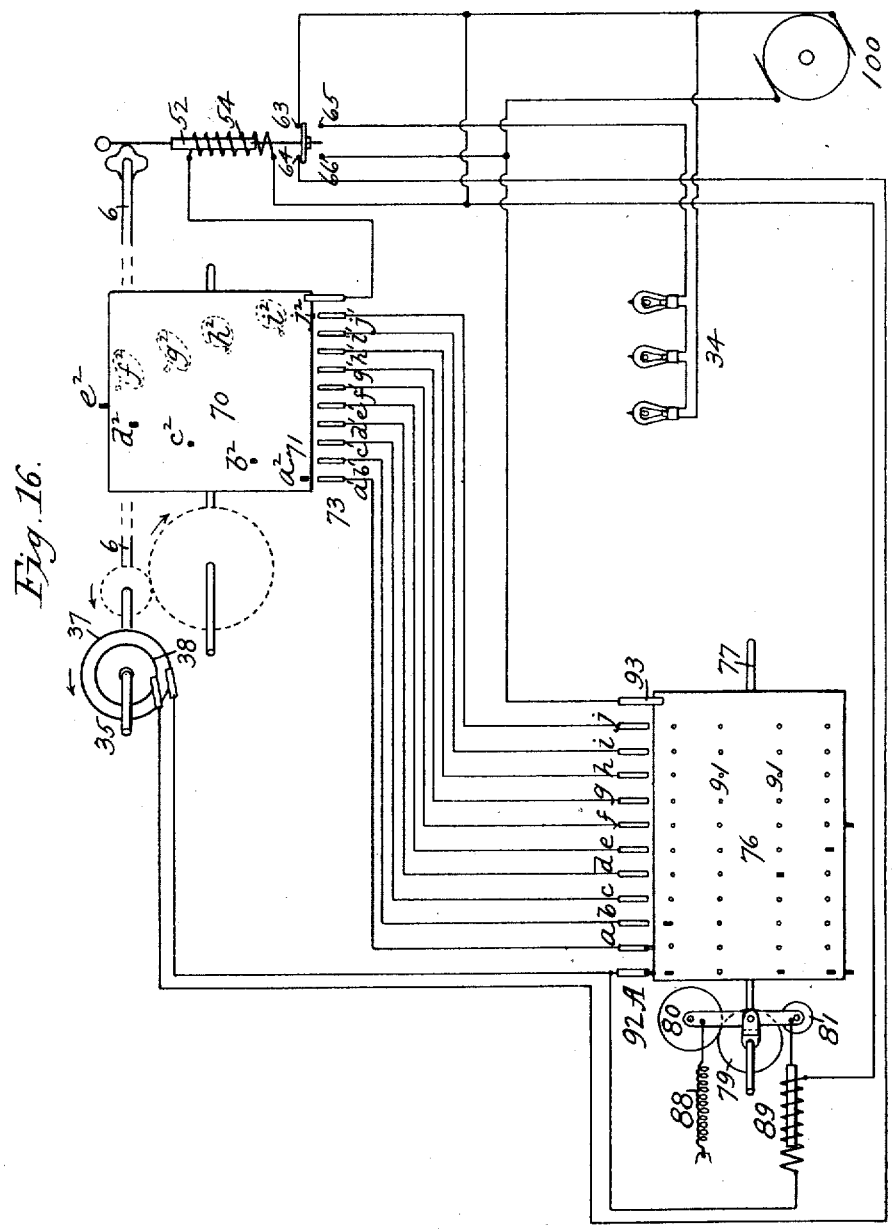

UNITED STATES PATENT OFFICE.

THOMAS W. THOMAS AND GEORGE W. GILLETTE, OF CLEVELAND, OHIO, ASSIGNORS, BY DIRECT AND MESNE ASSIGNMENTS, OF ONE-HALF TO SHERIDAN RISLEY, OF CLEVELAND, OHIO.

AUTOMATIC CHANGEABLE SIGN.

No. 821,068.   Specification of Letters Patent.   Patented May 22, 1906.

Application filed May 18, 1905. Serial No. 260,969.

*To all whom it may concern:*

Be it known that we, THOMAS W. THOMAS and GEORGE W. GILLETTE, citizens of the United States, residing at Cleveland, in the county of Cuyahoga and State of Ohio, have invented a new and useful Automatic Changeable Sign, of which the following is a specification.

Our invention relates to improvements in advertising-signs in which the signs continuously and automatically change; and the objects of our invention are, first, to provide a continuously-changing sign efficient and economical of operation which can be adapted to any number of signs, to signs of any size or shape, and to any space available; second, to provide efficient means for extracting and inserting different signs; third, to provide an automatic operating mechanism for such signs; fourth, to provide a simple and efficient controller which will afford facilities for easily changing the duration of exposure and order of succession of the various signs, and, fifth, to provide such a changeable sign which can be economically illuminated by any kind of light. We accomplish these objects with the novel arrangement and construction of parts hereinafter described, illustrated in the accompanying drawings, and pointed out in the claims appended hereto.

In the accompanying drawings, Figure 1 is a front view of the sign without the driving mechanism. Fig. 2 is a top view of the sign. Fig. 3 is a side view showing the magnetic brake and arrangement of the light and shield. Fig. 4 is a rear view of the magnetic brake. Fig. 5 is a side view of the magnetic clutch-driving mechanism. Fig. 6 is a detail showing the suspension of the sign-frames on the carrying-chains. Fig. 7 shows the suspension of the sign-frames between the crossbars. Fig. 8 is a cross-section of a sign-frame along the line B C, Fig. 6. Figs. 9 and 10 show the device for holding the signs in the sign-frames. Fig. 11 is a side view of the speed-regulator of the main controller. Fig. 12 is a top view of the same. Fig. 13 shows the controller for the magnetic brake. Fig. 14 shows the arrangement of the brushes on the main controller. Fig. 15 is a horizontal cross-section of the magnetic clutch, showing the arrangement of the magnet-coil and armature on the driving-shaft. Fig. 16 is a diagrammatic drawing showing the electric wiring and connection of the various parts in operation.

Similar characters refer to similar parts throughout the various views.

The four upright bars 1 1 and 2 2, secured to four horizontal bars 3 3, and the four connecting angle-irons 4 4 and 5 5 constitute the framework of the machine. The shaft 6, Figs. 1 and 4, turns in suitable bearings in the rear upright bars of the frame 2 2 and extends through on both sides thereof. The sprocket-wheel 7 is rigidly secured to the shaft 6 within and next to the bar 2 of the frame, and a similar sprocket-wheel is in like manner secured to said shaft on the opposite side of the frame. Two chains 8 of equal length run over these sprocket-wheels to two small sprocket-wheels 9, thence down the front of the machine and over two similar wheels 10, thence back over the large sprocket-wheels. The four small sprocket-wheels 9 and 10 turn on short studs 27, hung in the forward upright bars of the frame 1 1, and the inward ends of the studs are countersunk into the wheels, so as not to interfere with the revolution of the sign-frames. The length of the chains 8 depends on the number of signs to be shown. Square iron bars 11, Fig. 2, at equal intervals, their distance apart depending on the height of the signs to be shown, are suspended between these chains, both ends thereof being turned down and rounded and taking the place of rivets in the chains, as shown at 12, Figs. 2 and 6. Secured to the front of and running the length of these bars are thin plates 13, extending above and below the bars, Figs. 7, 8, and 10, and at both ends of each bar are secured side plates 23, Fig. 6, consisting of flat plates with their edges bent upward at right angles and then outward at right angles, so as to form flanges at both sides thereof, (conforming in shape to that of the plate 16, as shown in Fig. 10.) The U-shaped plate 15 is secured to and connects the ends of these plates 23, and as thus constructed the bars 11, the bottom plates 13, the end plates 23, and the top plate 15 form rectangular sign-character frames having retaining-flanges at the sides and tops. The sign characters are secured in these frames by the device shown in detail in Figs. 6, 9, and 10, in which 16 is a holding-plate with the edges bent upward and outward, as shown, Fig. 10, similar in shape to the side plates 23, equal in length to the height of the frame, secured to one end of which by the screw 21 is the slide 17, consisting of a plate pointed at 18, having the slit 19 and the flange 20 for a handle, which plate slides in the groove in the holding-plate under the head of the screw 21. The sign characters, which may be of any suitable material, are slid under the flanges at the top and sides of the frames 15 and 23, and the holding-plates are then placed between the edges of the sign characters, the end without the slide sliding under the top flange of the frame and the pointed end of the slide being pushed into the perforation 22 in the plate 13 at the bottom of the frame.

The sign-frames are connected to each other by collapsible rod and tube connections constructed as follows: To the under sides of the outer flanges of the side plates 23 of the sign-frames are secured small tubes 24, sliding into which are the rods 25, the free ends of which are secured to the succeeding cross-bars by being bent around the rounded part thereof, as shown at 26, Fig. 7. This device keeps the sign-frames in position between the cross-bars and at the same time compensates for the difference between the length of the arc described by the chain in traveling over the wheels and the distance between the bars by allowing the sign-frames to collapse or overlap when the chains travel around the sprocket-wheels.

A light-shield 30, Figs. 1 and 3, of suitable opaque material, covers the front of the machine, having an opening in the center the size of the signs being shown, being secured at the bottom to a rod 29, which is suspended between and turns in the brackets 28 28, attached to the upright bars 1 1 of the frame and being held in position by the spiral spring 31 31 on either side. This shield prevents the escape of any light except through the sign and by being hinged at the bottom does not interfere with the sign-frames as they turn corners.

The illumination is accomplished by the lamp or lamps 34, Fig. 3, which may be of any kind, contained in the sheet-iron box 32, the front end of which is open and the size of the signs shown fitting up close to the sign being shown, the inner sides of said box being polished and having a reflector 33 in the rear end. Said light-box may be supported in any suitable manner by supports or brackets extending from the sides of the frame, said supports being no part of our invention. We prefer to support it with the brackets 101 and 102, Fig. 3, which are secured to the lower frame-bars 4 and 5, as shown.

The signs are rotated by means of power applied to a magnetic clutch mechanism attached to one end of the shaft 6 and are stopped and held in position by means of a magnetic brake attached to the other end of said shaft, Fig. 2.

Fig. 15 shows a cross-section of the magnetic clutch, in which 6 is the shaft, extending through the rear bar 2 of the frame. The cast-iron frame 35, containing the magnet-coil 36, with the brass retaining-plate 34 secured to it, revolves freely on the shaft and forms the pulley to which power is applied by the belt 39, Figs. 2 and 5. To the outer side of this frame 35 are secured two concentric brass rings 37 and 38 of different diameters, each mounted on similar fibrous rings for insulation, to which the ends of the coil are connected, as shown, Fig. 15. The bracket 40, Figs. 2 and 5, secured to the rear upright bar 2 of the frame, carries the fiber plate 41, to which the two brushes 42 and 43 are attached and held in contact with the brass rings, as shown. A solid iron disk 44, Fig. 15, is secured to the shaft by a key 45, so as to have slight lateral movement thereon, but to revolve with the shaft. As thus arranged the pulley may revolve continuously on the shaft, but will revolve the shaft only when by being energized it attracts and turns the disk or armature 44.

The magnetic brake is shown in detail in Figs. 2, 3, and 4. To the end of the shaft 6 is secured the star-shaped brake-wheel 46. Attached to the top of the frame by the bolt 47 hangs the lever 48, secured to which, as shown, is the roller 49, which fits into the depressions in the brake-wheel 46 and holds the shaft stationary. The heavy lines, Fig. 3, show the position of the lever when holding the shaft, and the dotted lines show its position when the shaft is free to revolve. At the bottom of this lever is a bolt 50, securing the connecting-rod 51, which is bent and runs through a hole in the plunger 52 and is secured by a cotter-pin 53. The plunger 52 is an iron rod sliding back and forth within the magnetic coil 54, supported in an iron yoke or frame 55, which in turn rests on the base-board 56, attached to the frame of the machine. To the other end of the plunger 52 within the coil is secured the small brass rod 57, extending through the adjustable plug or bushing 60, which regulates the stroke of the plunger in the rear of the coil, around which rod is the spiral spring 58, attached to the nut 59 and the adjustable plug 60. The outer end of this rod is threaded and carries the metal cross-bar 61 and the regulating-nuts 62. 63 and 64 are insulated metal posts inserted in the clutch-coil circuit, which, with the bar 61, constitute a circuit-breaker for said clutch-coil circuit. 65 and 66 are similar posts inserted in the lighting-circuit, which, with the same cross-bar 61, constitute a circuit-breaker for said lighting-circuit.

When the coil 54 is energized, the plunger 52 is drawn in and the shaft is held by the lever and brake-wheel, as shown. In this position the cross-bar 61 completes the lighting-circuit and breaks the clutch-coil circuit, while when the circuit to said coil 54 is broken the spring 58 pushes the plunger out and releases the shaft, breaking the lighting-circuit and completing the clutch-coil circuit.

This sign as we have made it is operated by means of two controllers combined—a main controller for starting the magnetic clutch mechanism and another controller connected therewith for working the magnetic brake. On the shaft 6 between the frame and the magnetic clutch is secured a small cog-wheel 65, Fig. 2, geared into a large cog-wheel 66, which is secured to the outer end of the shaft 68, Fig. 13, turning in a bearing in the cross-frame 67, Fig. 5, attached to the main frame, as shown. On the inside of this cross-frame 67 is attached the bracket 69 by the bolt 72, which supports the other end of the shaft 68, secured to and turning with which is a brass cylinder 70. The cog-wheels 65 and 66 are of such relative size that the cylinder 70, turning with the large wheel, makes one complete revolution simultaneously with a complete revolution of the signs. Secured to a bar 75, running from the bracket 69 to the cross-frame 67 and insulated therefrom and from each other, are the brushes 73, ($a'$ $b'$ $c'$ $d'$ $e'$ $f'$ $g'$ $h'$ $i'$ $j'$ $k'$,) the number of which depends on and corresponds with the number of sign-frames in the carrying-chains. On the cylinder 70 at regular intervals around the circumference thereof are secured the metal contact-pins 71, ($a^2$ $b^2$ $c^2$ $d^2$ $e^2$ $f^2$ $g^2$ $h^2$ $i^2$ $j^2$ $k^2$,) one for each brush and so placed laterally that each will make contact when the cylinder is rotated with its corresponding brush and with only that brush. 74 is another brush secured similarly to the others, but making continuous contact with the cylinder. The wires are so connected to these brushes, as will be hereinafter shown, that when a certain pin makes contact with its corresponding brush the magnetic brake stops and holds the signs stationary.

The main controller consists of the brass cylinder 76, Fig. 16, supported on the shaft 77, turning in any suitable support at one end and in the support and housing 78, Fig. 11, at the other. The device illustrated in Figs. 11 and 12 is for the purpose of giving two speeds to this controller. Two speeds are given for the purpose of having the controller revolve quickly when there are no signs being shown and slowly when there are. Secured to the outer end of said shaft 77 is the cog-wheel 79, which is turned by either of the cog-wheels 80 or 81, geared into it. Turning in a bearing in the top of the support 78 is a short shaft 82, on the outer end of which is secured the small pulley 83, to which any available power is applied by a belt 84. On the other side of the support is secured to this shaft and turning freely on it the rocker-arm 85, and at either end thereof are secured on suitable studs the cog-wheels 80 and 81. Three similar sprocket-wheels 86 86 86 are secured to the cog-wheels 80 and 81 and to the shaft 82, respectively, over which runs the chain 87, so that the power applied to the pulley 83 turns the cog-wheels 80 and 81 in unison. These cog-wheels are so adjusted on the rocker-arm 85 that when one is in gear the other is free. The large cog-wheel 80, which turns the cylinder fast, is held in gear by the spiral spring 88, and this gear is released and the small cog-wheel thrown in, turning the cylinder slowly by the energization of the magnet-coil 89, which pulls down the plunger 90, sliding within said coil and attached to the arm 85 by a small connecting-rod, as shown. On the cylinder 76, at equal intervals around it, are lateral rows of holes 91, Fig. 16, the number of rows being not less than the number of sign-frames on the carrying-chains. The number of these holes in each row is one greater than the number of sign-frames on the carrying-chains and are so spaced apart as to form rows running around the cylinder in alinement with a row of brushes 92, (A $a$ $b$ $c$ $d$ $e$ $f$ $g$ $h$ $i$ $j$,) attached to any suitable support, insulated therefrom and from each other and so hung as to make contact with suitable pins when placed in the holes in the cylinder. The brush 93 is similarly supported and so hung as to make continuous rubbing contact with the cylinder. For our purposes it is necessary that the brushes on this controller make a quick break when leaving the contact-pins, and we do this with the device shown in Fig. 14, in which 94 is the brush-support, 95 the brush, hinged at 96, with the lug or pin 97 and the spring 98 holding it in position. As the contact-pin 99 moves upward the hinged brush moves with it, taking the position shown by the dotted lines, until the end of the pin passes the edge of the brush, when the spring pulls the brush back, making a quick break.

The main controller may be placed in any convenient place and need not be near the rest of the machine, as power running it may be applied separately from the power turning the signs.

In Fig. 16 is shown a diagrammatic drawing of the wiring and operation of the sign as a whole. The brushes 92 ($a$ $b$ $c$ $d$ $e$ $f$ $g$ $h$ $i$ $j$) are connected by separate wires with the corresponding brushes 73 ($a'$ $b'$ $c'$ $d'$ $e'$ $f'$ $g'$ $h'$ $i'$ $j'$) on the brake-controller. In operation the magnetic clutch or pulley is revolved continuously on its shaft and the main controller is revolved, the spring of the speed-regulator holding it at fast speed. The electric current flows from the source 100 to the brush 93, which being in continuous contact with the brass cylinder 76 of the main controller makes said cylinder alive. To show any particular sign, two contact-pins are inserted in one of the rows of holes in cylinder 76, one in the end hole, so as to make contact with the brush 92ᴬ, and the other in the hole which will make contact with the brush corresponding with the sign to be shown. When the cylinder revolves so as to make contact between the pin and the brush 92ᴬ, the circuit is completed through the coil 89, which throws in the slow gear for the controller and also energizes the magnetic clutch or pulley 35, thus revolving the signs and with them the cylinder 70 of the brake-controller. At the same time the other contact-pin makes contact with its corresponding brush, making the brush on the brake-controller with which it is connected alive, and when the corresponding pin on the cylinder 70 makes contact with this brush the circuit through the brake-coil 54 is completed, and the plunger 52 stops the further rotation of the signs. At the same time by the movement of this plunger the circuit through the magnetic clutch 35 is broken at 63 64, leaving said clutch or pulley revolving freely and the lighting-circuit completed at 65 66. When the main controller rotates so that the contacts between the pins and brushes are broken, the spring 88 throws the large gear 80 in, putting the cylinder 76 again at fast speed, the spring on the brake releases the shaft 6 and breaks the lighting-circuit.

By this system of controllers any number of signs may be shown in any order desired and may be repeated or skipped by placing or omitting the contact-pins in the corresponding holes in the main controller-cylinder.

Having thus fully described the construction and operation of our invention, what we claim as new, and desire to secure by Letters Patent, is—

1. A changeable sign, comprising rigid sign-frames suspended between chains traveling around sprocket-wheels, means for securing the sign-frames so as to allow them to travel with the chains around the sprockets, comprising a rod hinged to each sign-frame and a tube secured to each preceding sign-frame into which said rod slides, substantially as described.

2. In a changeable sign, the combination of a pair of endless chains, pairs of sprockets around which the chains are caused to travel, a driving-shaft secured to a pair of said sprockets to turn said chains in unison, a series of bars extending between said chains, the ends of said bars being shaped to take the place of and serve as rivets of said chains, sign-frames secured to each bar, and means for attaching the sign-frames to each succeeding bar, comprising a tube attached to the under side of each frame and a rod sliding therein attached to each succeeding bar and free to turn thereon, substantially as described.

3. In a changeable sign, the combination of a pair of endless chains, pairs of sprockets around which the chains are caused to travel, a driving-shaft secured to a pair of said sprockets, a series of bars suspended between said chains, sign-frames secured to each bar and connected to each succeeding bar by a collapsible rod and tube connection, a light-shield having an opening the size of the sign-frames secured to the front of the sign by hinges and springs, and a source of lighting contained in a suitable light-box secured behind the light-shield and within the series of sign-frames, substantially as described.

4. In a changeable sign, the combination of a sign-carrier comprising a series of sign-frames suspended between a pair of endless chains, pairs of sprockets around which the chains are caused to travel and a driving-shaft to which a pair of said sprockets are secured, with a magnetic clutch attached to said driving-shaft, consisting of a magnet-coil contained in a suitable iron frame with a brass retaining-plate, said frame being free to revolve on said shaft and constituting the pulley to which power is applied, insulated brass rings concentric with said shaft secured to the outside of said iron frame and connected with the opposite ends of said magnet-coil, a brush for each ring suitably suspended to make contact therewith, and an iron disk or armature keyed to revolve with said shaft but to have slight lateral movement thereon, substantially as described.

5. In a changeable sign, the combination of a sign-carrier comprising a series of sign-frames suspended between a pair of endless chains, pairs of sprockets around which the chains are caused to travel and a driving-shaft to which a pair of said sprockets are secured, with a magnetic brake, consisting of a star-shaped brake-wheel secured to said driving-shaft, a lever having a roller secured thereto to fit into the indentations of said brake-wheel, a magnet-coil, a plunger sliding in said magnet-coil, a rod connecting the plunger and lever, an adjustable bushing in the rear end of the yoke of the magnet-coil for regulating the stroke of the plunger, a small brass rod secured to the end of the plunger and extending through said bushing, and a spring attached to said rod and the yoke of the coil to throw the plunger out, substantially as described.

6. In a changeable sign, the combination of a sign-carrier, a main shaft in driving connection therewith, a magnetic brake mechanism operating on the end of said shaft, consisting of an indented wheel secured to the shaft, a lever fitting against said wheel, a plunger sliding in a magnet-coil, a rod connecting lever and plunger, a brass rod extending through the rear end of the yoke of the coil, and a spring attached to said rod to throw out the plunger when the magnet-coil is inert, two electric circuits, a pair of posts inserted in each of said circuits, and a circuit-breaker comprising an adjustable cross-bar secured to said brass rod of the magnetic brake mechanism and arranged to connect and disconnect said posts with the movement of the plunger, all substantially as described.

7. In a changeable sign, the combination of a sign-carrier comprising a series of sign-frames revolving around a main shaft in driving connection therewith, a magnetic brake mechanism comprising a lever, a magnet-coil, plunger and spring for operating said lever, and an indented wheel secured to said main shaft, into the indentations of which said lever works, and an electric controller for said brake mechanism, consisting of a brass cylinder suitably supported, gearing for imparting motion from the main shaft to said cylinder by which it is caused to make one complete revolution simultaneously with a like revolution of the sign-carrier, a series of contact-pins, one for each sign-frame, inserted in the periphery of said cylinder and arranged to correspond in relative position to the relative position of the sign-frames, a corresponding number of brushes suitably supported to make contact each with one only of said pins when the cylinder revolves, and a brush suitably supported to make continuous contact with said cylinder, substantially as described.

8. In a changeable sign, the combination of a sign-carrier comprising a series of sign-frames suspended between a pair of chains, pairs of sprockets over which the chains are caused to run, and a shaft in driving connection therewith, a magnetic clutch mechanism to rotate said shaft, comprising a magnet-coil rotating freely on and an armature keyed to said shaft, and a two-speed electric controller, consisting of a shaft turning in suitable supports, a brass cylinder with lateral rows of holes in its outer surface, secured to said shaft, contact-pins for insertion in said holes, a row of brushes suitably supported, one brush making continuous contact with said cylinder and the others suspended to make contact with the pins when inserted, a gear secured to the aforesaid cylinder-shaft, a rocker-arm suitably supported, a large and a small gear suspended on either end of said rocker-arm, a pulley to which power is applied, sprockets and a chain for imparting motion from said power-pulley to said large and small gears, a spring for holding the large gear in mesh with the gear on the cylinder-shaft, and a magnet-coil and plunger for pulling the large gear out of mesh and the small gear in mesh, substantially as described.

9. In a changeable sign, the combination of a sign-carrier comprising a series of sign-frames, a pair of endless chains between which the sign-frames are suspended, pairs of sprockets over which the chains are caused to travel and a shaft in driving connection therewith, a magnetic clutch mechanism for rotating said shaft, a magnetic brake mechanism for holding said shaft stationary, and an electric controller for operating the clutch and brake, consisting of two combined controllers, the first comprising a brass cylinder having lateral rows of holes on its outer surface, means for revolving said cylinder at fast or slow speed automatically, comprising a set of constantly-rotating gears suspended on a rocker-arm, a spring for throwing the fast gear in mesh and a magnet-coil and plunger for throwing the slow gear in mesh, a brush suitably supported and suspended to make continuous contact with said cylinder, contact-pins for insertion in the holes in said cylinder, and a series of brushes suitably supported and suspended to make contact with said pins when inserted, the other comprising a brass cylinder having a series of contact-pins arranged thereon to correspond to the relative position of the sign-frames, a corresponding number of brushes suitably supported and suspended to make contact each with one only of said pins, wiring connecting each of said brushes with a corresponding brush on the other controller, a brush suitably supported to make continuous contact with said cylinder, and gearing for imparting motion to said cylinder from the sign-carrier shaft to cause it to revolve simultaneously with a revolution of the sign-carrier, all substantially as described.

10. In a changeable sign, the combination of a sign-carrier comprising a series of sign-frames, a pair of endless chains, means for suspending the sign-frames between said chains, including a collapsible rod and tube connection between the frames for allowing them to turn angles with the chains, pairs of sprockets around which the chains are caused to travel, and a driving-shaft secured to a pair of said sprockets for imparting motion to the chains, a magnetic clutch mechanism secured to said shaft, comprising a magnet-coil constantly rotating on said shaft and an armature slidably but non-rotatably fixed on said shaft, an electric circuit running through said magnet-coil, hereinafter called the clutch-coil circuit, means for illuminating the signs comprising a suitable reflector-box, suitable electric lamps contained in said box and a lighting-circuit running through said lamps, a magnetic brake mechanism operating on said shaft, comprising an indented brake-wheel, a lever fitting into the indentations of said brake-wheel, a magnet-coil and plunger for operating said lever, and a spring for releasing same, a circuit-breaker comprising two sets of posts inserted one set in the magnetic clutch-coil circuit and the other in the lighting-circuit, and a connecting-bar operated by the movement of the plunger of the magnetic brake mechanism, an electric controller for the magnetic brake mechanism, comprising a brass cylinder with contact-pins in its outer surface, in number equal to the number of sign-frames, a corresponding number of brushes suitably supported and suspended to make contact each with one only of said pins, gearing for causing said cylinder to revolve simultaneously with a revolution of the sign-carrier, the pins and brushes being so arranged to have a pin make contact when its corresponding sign-frame is in display position, a brush suitably supported and suspended to make continuous contact with the cylinder, and wiring connecting said brush with the magnet-coil of the brake mechanism, and a main electric controller comprising a cylinder with lateral rows of holes thereon, contact-pins for insertion in said holes, means for revolving said cylinder at fast or slow speed automatically, comprising a rocker-arm, a large and a small gear on either end of said arm, means for imparting continuous motion to these gears, a gear in driving connection with the cylinder, a spring for holding the large gear in mesh for turning the cylinder fast, and a magnet-coil and plunger for pulling the small gear in mesh for turning the cylinder slow, a brush suitably supported and suspended to make continuous contact with said cylinder, wiring connecting said brush with the source of power, a row of brushes corresponding in number to the number of sign-frames suitably supported and suspended to make contact with the contact-pins when inserted, wiring connecting each of said brushes with its corresponding brush on the brake-mechanism controller, a brush suitably supported and suspended to make contact with pins when inserted, and wiring connecting this brush with the magnetic clutch-coil and also through the magnet-coil of the speed-regulator of the controller, and wiring from the magnetic clutch-coil through the circuit-breaker, substantially as shown and described.

In testimony whereof we have signed our names to this specification in the presence of two subscribing witnesses.

THOMAS W. THOMAS.
GEORGE W. GILLETTE.

Witnesses:
WM. H. CHAPMAN,
EDWARD J. ROBINSON.